United States Patent [19]

Takeuchi et al.

[11] Patent Number: 5,576,417
[45] Date of Patent: Nov. 19, 1996

[54] METHOD FOR SYNTHESIZING AROMATIC POLYMERS

[75] Inventors: Kazuhiko Takeuchi; Yoshihiro Kubota; Takaaki Hanaoka; Takehiko Matsuzaki; Yoshihiro Sugi, all of Tsukuba; Tatsuya Eto, Ibaraki-ken; Tokio Hagiwara, Tokyo; Tadashi Narita, Yokohama, all of Japan

[73] Assignee: Director-General of Agency of Industrial Science and Technology, Tokyo, Japan

[21] Appl. No.: 304,949

[22] Filed: Sep. 13, 1994

[30] Foreign Application Priority Data

Dec. 24, 1993 [JP] Japan .................................. 5-347977

[51] Int. Cl.$^6$ .................................................. C08G 69/26
[52] U.S. Cl. ........................... 528/343; 528/335; 528/347
[58] Field of Search .................................. 528/343, 347, 528/335

[56] References Cited

U.S. PATENT DOCUMENTS 4,933,468   6/1990   Perry et al. ............................. 548/476

OTHER PUBLICATIONS

1 B4 02 of ISSN 285-7626, p. 169, Sep. 13, 1993.

Primary Examiner—James J. Seidleck
Assistant Examiner—Duc Truong
Attorney, Agent, or Firm—Birch, Stewart, Kolasch & Birch, LLP

[57] ABSTRACT

There is disclosed a method for producing aromatic polyamides represented by the following formula (III), which comprises reacting an aromatic dihalogen compound represented by the following formula (I) with a diamine compound represented by the following formula (II) in the presence of cobalt/phosphine complex and a basic substance under carbon monoxide atmosphere:

$$X_1-Ar-X_2 \quad \text{formula (I)}$$

wherein Ar represents an aromatic residue and $X_1$ and $X_2$ each represent a bromine or iodine atom, $$H_2N-R-NH_2 \quad \text{formula (II)}$$

wherein R represents a divalent hydrocarbon group, and formula (III)

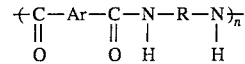

wherein Ar and R each have the same meaning as the above, and n is a positive integer.

20 Claims, No Drawings

METHOD FOR SYNTHESIZING AROMATIC POLYMERS

FIELD OF THE INVENTION

The present invention relates to a novel method for producing aromatic polyamides. More particularly, the present invention relates to a method for producing aromatic polyamides by reacting aromatic dihalogen compounds with diamine compounds under a carbon monoxide atmosphere, using as a catalyst a cobalt/phosphine complex.

BACKGROUND OF THE INVENTION

Since various polymer compounds whose skeleton is an aromatic compound are excellent, for example, in thermal resistance, radiation resistance, corrosion resistance, and mechanical strength, they are used, for example, as engineering plastics or super-engineering plastics. In particular, since aromatic polyamides show high crystallinity, they play an important role as a high-performance fiber material.

Although dicarboxylic acids are low in reactivity, since aliphatic diamines are moderate in nucleophilicity, aliphatic polyamides, such as 6,6-nylon, can readily be obtained by heating a salt of an aliphatic diamine and an aliphatic dicarboxylic acid, to carry out a dehydration reaction. On the other hand, aromatic diamines are low in nucleophilicity, and therefore it is difficult to obtain a high-molecular weight polyamide by heating a combination of an aromatic diamine with an aromatic dicarboxylic acid. Therefore, conventionally, to produce aromatic polyamides, for example, the following techniques are known: (1) a method wherein an aromatic acid chloride that is the most reactive among carboxylic acids is reacted with a diamine; (2) a direct polycondensation method, wherein a dicarboxylic acid and a diamine are reacted in the presence of a condensation agent, such as triphenyl phosphite; (3) a method wherein a polycondensation is carried out using amino groups activated, for example, with N-acetyldiamine and a dicarboxylic acid; and (4) a method wherein an aromatic diamine is converted to diacetamide, and then this diacetamide and an aromatic dicarboxylic acid are heated to a high temperature of 200° to 350° C., to effect amide exchange. In any of these methods, unstable and expensive compounds, such as aromatic dicarboxylic acids, activated diamine compounds, and dicarboxylic acid compounds, must to be used as raw materials.

On the other hand, a method is suggested wherein a dihalogen compound, such as an aromatic dibromide and an aromatic diiodide, is used as a raw material, and the dihalogen compound and a diamine compound are condensed by using a palladium complex catalyst under a carbon monoxide atmosphere, with carbonylation being effected (M. Yoneyama, M. Kakimoto, and Y. Imai, Makromol., 21, 1908 (1988)). Although this method is advantageous over conventional methods, in that an aromatic dihalide that can be readily synthesized is used as a raw material and the reaction conditions are moderate, the method nonetheless requires improvement because, for example, an expensive palladium complex is used as a catalyst, and also the molecular weight of the produced polymer is not fully satisfactory.

SUMMARY OF THE INVENTION

Therefore, an object of the present invention is to provide an inexpensive and high-performance catalyst that is used in the reaction for forming aromatic polyamides, by using, as a starting raw material, a readily available aromatic dihalogen compound, and reacting it with a diamine compound through carbonylation reaction in a carbon monoxide atmosphere.

Another object of the present invention is to provide a method for producing aromatic polyamides by reacting a readily available aromatic dihalogen compound with a diamine compound in a carbon monoxide atmosphere.

The above and other objects, features, and advantages of the invention will become fully apparent in the following description.

DETAILED DESCRIPTION OF THE INVENTION

The present inventors have studied keenly in various ways to attain the above object and have found that, by using a cobalt/phosphine complex as a catalyst, a polycondensation reaction of an aromatic dihalogen compound with a diamine compound, through carbonylation by introducing carbon monoxide proceeds quickly, to produce the corresponding aromatic polyamide, which finding has led to the completion of the present invention.

That is, the present invention provides a method for producing aromatic polyamides represented by the following formula (III), which comprises reacting an aromatic dihalogen compound represented by the following formula (I), a diamine compound represented by the following formula (II), and carbon monoxide in the presence of cobalt/phospholine complex and a basic substance:

$$X_1—Ar—X_2 \qquad \text{formula (I)}$$

wherein Ar represents an aromatic residue and $X_1$ and $X_2$ each represent a bromine or iodine atom,

$$H_2N—R—NH_2 \qquad \text{formula (II)}$$

wherein R represents a divalent hydrocarbon group, and formula (III)

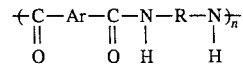

wherein Ar and R each have the same meaning as the above, and n is a positive integer.

Now the present invention will be described in detail.

The aromatic dihalogen compound for use in the present invention is a compound represented by formula (I), wherein Ar represents an aromatic residue, which is substituted or unsubstituted, and $X_1$ and $X_2$ each represent bromine or iodine. Preferably specific example of Ar in formula (I) includes, for example, substituted or unsubstituted benzene ring, naphthalene ring, anthracene ring, phenanthrene ring, and thiophene ring. Specific examples of the compound represented by formula (I) include dibromo compounds, such as 1,3-dibromobenzene, 1,4-dibromobenzene, dibromonaphthalene, dibromoanthracene, dibromophenanthrene, bis(3-bromophenyl)methanol, bis(4-bromophenyl)methane, bis(4-bromophenyl)ether, bis(4-bromophenyl)sulfide, bis(4-bromophenyl)sulfone, 2,5-dibromothiophene, 4,4'-dibromobiphenyl, and 2,7-dibromo-9,10-dihydrophenanthrene; and diiodo compounds, such as 1,4-diiodobenzene, diiodonaphthalene, diiodoanthracene, diiodophenanthrene, bis(3-iodophenyl)methanol, bis(4-iodophenyl)methane, bis(4-iodophenyl)ether, bis(4-iodophenyl)sulfide, bis(4- iodophenyl)sulfone, 2,5-diiodothiophene, 4,4'-diiodobiphenyl, and 2,7-diiodo-9,10-dihydrophenanthrene.

The diamine compound for use in the present invention is a compound represented by formula (II), wherein R represents a divalent hydrocarbon group. Preferably specific example of R in formula (II) includes, for example, a divalent aromatic group such as benzene ring, naphthalene ring, or biphenyl residue, and a divalent aliphatic group such as 1,2-ethane residue or 1,3-propane residue. Specific examples of the diamines represented by formula (II) include aromatic diamines, such as 1,3-diaminobenzene, 1,4-diaminobenzene, diaminonaphthalene, diaminoanthracene, diaminophenanthrene, bis(4-aminophenyl)methane, bis(4-aminophenyl)ether, bis(4-aminophenyl)sulfide, bis(4-aminophenyl)sulfone, 2,5-diaminothiophene, 4,4'-diaminobiphenyl, and 2,7-diamino-9,10-dihydrophenanthrene, and aliphatic diamines, such as 1,2-diaminoethane, 1,3-diaminopropane, 1,4-diaminobutane, 1,5-diaminopentane, 1,6-diaminohexane, 1,8-diaminooctane, and 1,10-diaminodecane.

The aromatic dihalogen compound represented by formula (I) is used in a molar ratio preferably in 0.9 to 1.1, more preferably 0.95 to 1.05 to the diamine compound represented by formula (II).

The aromatic polyamides obtained by the method of the present invention is represented by the above formula (III), wherein Ar and R each have the same meaning as the above, and n is a positive integer presenting numbers of repeating unit and is preferably an integer between 5 and 1,000, more preferably between 5 and 500.

As the catalyst for the synthesis of the aromatic polyamide in the present invention, various cobalt/phosphine complexes, including conventionally known ones, are used. The cobalt/phosphine complex may be prepared previously outside of the reaction system, and then be added to the reaction system, or the cobalt/phosphine complex may be formed under the reaction conditions by charging various cobalt salts and phosphines in a certain ratio into the reaction vessel. In the latter case, the amount of the phosphines to be used is adjusted to 1 to 10 mol equivalents, preferably 2 to 6 mol equivalents, per cobalt atom. The amount of the cobalt complex to be used is ½ to 1/1000 mol equivalent, preferably ⅕ to 1/100 mol equivalent, in terms of the cobalt atom, to the aromatic dihalogen compound. As the cobalt compound, various compounds including inorganic salts, such as cobalt chloride, cobalt bromide, cobalt iodide, cobalt carbonate, and basic cobalt carbonate; organic salts, such as cobalt acetate, cobalt formate, cobalt oxalate, and cobalt acetylacetonato; and cluster complexes, such as dicobaltoctacarbonyl and tetracobaltdodecacarbonyl, can be used. As the phosphines, various phosphines including aromatic phosphines, such as triphenylphosphine, tritolylphosphine, and trianisylphosphine; alkyl-phosphines, such as tributylphosphine and triisopropyl-phosphine, and aromatic di-phosphines, such as 1,2-bis(diphenylphosphino)ethane, 1,3-bis(diphenylphosphino)propane, 1,4-bis(diphenylphosphino)butane, 1,5-bis(diphenylphosphino)pentane; and 1,6-bis(diphenylphosphino)hexane, can be used.

The basic substance for use in the present invention has an effect of accelerating the reaction remarkably, by capturing a hydrogen halide produced along with the proceeding of the reaction. Therefore, in the process of the present invention, in order to produce the intended polymer efficiently, the reaction is preferably carried out in the presence of a basic substance. Such a basic substance includes organic bases, for example, aliphatic amines, such as triethylamine, tributylamine, and diisopropylethylamine, cyclic amines, such as 1,8-diazabicyclo[5,4,0]-7-undecene, 1,5-diazabicyclo[2,2,2]-5-nonene, 1,4-diazabicyclo[2,2,2]octane, and hexamethylenetetramine, diamines, such as N,N,N',N'-tetramethylethylenediamine, and N,N,N',N'-tetramethylhexamethylenediamine, aromatic amines, such as N,N-dimethylaniline, pyridine, 2,6-lutidine, 4-dimethylaminopyridine, and inorganic bases, for example, potassium carbonate, sodium carbonate, and potassium hydroxide. In the process of the present invention, cyclic amines, such as 1,8diazabicyclo[5,4,0]-7-undecene, 1,5-diazabicyclo[2,2,2]-5-nonene, 1,4-diazabicyclo[2,2,2]octane, hexamethylenetetramine, and N,N,N',N'-tetramethylethylenediamine, and diamines, showed a particularly high activation promoting effect. The amount of these basic substances to be added is preferably 2 to 4 mol equivalents to the aromatic dihalogen compound.

The reaction developed by the present invention is preferably carried out in a solvent. As the solvent, any solvent can be used without restrictions as long as the solvent does not react with the raw materials and other various compounds. In particular, various amide solvents, such as N,N-dimethylformamide, N,N-dimethylacetamide, N-methyl-2-pyrrolidone, N,N,N',N'-tetramethylurea, and hexamethylenephophoramide, are particularly preferable, because it is observed that they can well dissolve the polymer produced, and they have an effect of improving the molecular weight of the polymer.

In the process of the present invention, preferably the reaction is carried out under pressure of carbon monoxide, and at that time the pressure is in the range of 1 to 100 kg/cm$^2$, preferably 3 to 50 kg/cm$^2$, in terms of the gauge pressure. Therefore, as the reaction apparatus, a usual flow- or batch-type high-pressure reaction apparatus is used. The reaction temperature is in the range of 100° to 200° C., preferably 110° to 180° C.. The reaction is completed when the absorption of carbon monoxide stops. The reaction is preferably carried out for a period of time in the range of 5 to 72 hours.

According to the method of the present invention, by using an inexpensive cobalt/phosphine complex as a catalyst and readily available aromatic dicarboxylic acids and diamine compounds as starting raw materials, aromatic polyamides useful as various functional polymer materials can be obtained efficiently and readily.

Now, the present invention is described in more detail based on the following Examples, but the invention is not limited to them.

EXAMPLE 1

In a 50-ml autoclave, 845.1 mg (2.5 mmol) of 2,7-dibromo-9,10-dihydrophenanthrene, 540.8 mg (2.5 mmol) of bis(4-aminophenyl.)sulfide, 39.0 mg (0.30 mmol) of cobalt chloride anhydride, 314.7 mg (1.2 mmol) of triphenylphosphine, and 989.6 mg (6.5 mmol) of 1,8-diazabicyclo[5,4,0]-7-undecene were dissolved in dimethylacetamide (5.0 ml); the inside was replaced with nitrogen gas, and then was pressurized with carbon monoxide to 20 kg/cm$^2$; the temperature was elevated to 150° C., and the reaction was carried out for 24 hours, with vigorous stirring. After the reaction, excess carbon monoxide was removed, followed by dilution with dimethylacetamide (5 ml); the solution was poured into methanol (200 ml), and the deposited solid was washed with methanol and then was dried under reduced pressure to obtain the intended polyamide compound (yield: 1.21 g).

The weight-average molecular weight (Mw) was determined by gel permeation chromatography (GPC), with a polystyrene used as a reference. Mw=$2.21 \times 10^4$.

EXAMPLE 2

In a 50-ml autoclave, 845.1 mg (2.5 mmol) of 2,7-dibromo-9,10-dihydrophenanthrene, 500.6 mg (2.5 mmol) of bis(4-aminophenyl)ether, 39.0 mg (0.30 mmol) of cobalt chloride anhydride, 314.7 mg (1.2 mmol) of triphenylphosphine, and 989.6 mg (6.5 mmol) of 1,8-diazabicyclo[5,4,0]-7-undecene were dissolved in dimethylacetamide (5.0 ml), and similarly to Example 1, the inside was pressurized to 20 kg/cm$^2$ with carbon monoxide, and the reaction was carried out at 150° C. for 24 hours. After the reaction, the deposited solid was washed with methanol and was dried under reduced pressure to obtain the intended polyamide compound (yield: 1.15 g). Mw=$2.60 \times 10^4$.

EXAMPLE 3

In a 50-ml autoclave, 845.1 mg (2.5 mmol) of 2,7-dibromo-9,10-dihydrophenanthrene, 495.7 mg (2.5 mmol) of bis(4-aminophenyl)methane, 39.0 mg (0.30 mmol) of cobalt chloride anhydride, 314.7 mg (1.2 mmol) of triphenylphosphine, and 989.6 mg (6.5 mmol) of 1,8-diazabicyclo[5,4,0]-7-undecene were dissolved in dimethylacetamide (5.0 ml), and similarly to Example 1, the inside was pressurized to 20 kg/cm$^2$ with carbon monoxide, and the reaction was carried out at 150° C. for 24 hours. After the reaction, the deposited solid was washed with methanol and was dried under reduced pressure to obtain the intended polyamide compound (yield: 1.23 g). Mw=$1.10 \times 10^4$.

EXAMPLE 4

In a 50-ml autoclave, 845.1 mg (2.5 mmol) of 2,7-dibromo-9,10-dihydrophenanthrene, 620.8 mg (2.5 mmol) of bis(4-aminophenyl)sulfone, 39.0 mg (0.30 mmol) of cobalt chloride anhydride, 314.7 mg (1.2 mmol) of triphenylphosphine, and 989.6 mg (6.5 mmol) of 1,8-diazabicyclo[5,4,0]-7-undecene were dissolved in dimethylacetamide (5.0 ml), and similarly to Example 1, the inside was pressurized to 20 kg/cm$^2$ with carbon monoxide, and the reaction was carried out at 150° C. for 24 hours. After the reaction, the deposited solid was washed with methanol and was dried under reduced pressure to obtain the intended polyamide compound (yield: 1.23 g). Mw=$2.33 \times 10^4$.

EXAMPLE 5

In a 50-ml autoclave, 1,015.0 mg (2.5 mmol) of 4,4'-diiodobiphenyl, 620.8.6 mg (2.5 mmol) of bis(4-aminophenyl)sulfone, 39.0 mg (0.30 mmol) of cobalt chloride anhydride, 314.7 mg (1.2 mmol) of triphenylphosphine, and 989.6 mg (6.5 mmol) of 1,8-diazabicyclo[5,4,0]-7-undecene were dissolved in dimethylacetamide (5.0 ml), and similarly to Example 1, the inside was pressurized to 20 kg/cm$^2$ with carbon monoxide, and the reaction was carried out at 150° C. for 24 hours. After the reaction, the deposited solid was washed with methanol and was dried under reduced pressure to obtain the intended polyamide compound (yield: 1.37 g). Mw=$1.42 \times 10^4$.

EXAMPLE 6

In a 50-ml autoclave, 1,015.0 mg (2.5 mmol) of 4,4'-diiodobiphenyl, 620.8.6 mg (2.5 mmol) of bis(4-aminophenyl)sulfone, 39.0 mg (0.30 mmol) of cobalt chloride anhydride, 314.7 mg (1.2 mmol) of triphenylphosphine, and 989.6 mg (6.5 mmol) of 1,8-diazabicyclo[5,4,0]-7-undecene were dissolved in dimethylacetamide (5.0 ml), and similarly to Example 1, the inside was pressurized to 5 kg/cm$^2$ with carbon monoxide, and the reaction was carried out at 150° C. for 24 hours. After the reaction, the deposited solid was washed with methanol and was dried under reduced pressure to obtain the intended polyamide compound (yield: 1.41 g). Mw=$3.21 \times 10^4$.

EXAMPLE 7

In a 50-ml autoclave, 1,015.0 mg (2.5 mmol) of 4,4'-diiodobiphenyl, 620.8.6 mg (2.5 mmol) of bis(4-aminophenyl)sulfone, 65.6 mg (0.30 mmol) of cobalt bromide anhydride, 314.7 mg (1.2 mmol) of triphenylphosphine, and 989.6 mg (6.5 mmol) of 1,8-diazabicyclo[5,4,0]-7-undecene were dissolved in dimethylacetamide (5.0 ml), and similarly to Example 1, the inside was pressurized to 20 kg/cm$^2$ with carbon monoxide, and the reaction was carried out at 150° C. for 24 hours. After the reaction, the deposited solid was washed with methanol and was dried under reduced pressure to obtain the intended polyamide compound (yield: 1.28 g). Mw=$1.26 \times 10^4$.

EXAMPLE 8

In a 50-ml autoclave, 1,015.0 mg (2.5 mmol) of 4,4'-diiodobiphenyl, 620.8.6 mg (2.5 mmol) of bis(4-aminophenyl)sulfone, 93.8 mg (0.30 mmol) of cobalt iodide anhydride, 314.7 mg (1.2 mmol) of triphenylphosphine, and 989.6 mg (6.5 mmol) of 1,8-diazabicyclo[5,4,0]-7-undecene were dissolved in dimethylacetamide (5.0 ml), and similarly to Example 1, the inside was pressurized to 20 kg/cm$^2$ with carbon monoxide, and the reaction was carried out at 150° C. for 24 hours. After the reaction, the deposited solid was washed with methanol and was dried under reduced pressure to obtain the intended polyamide compound (yield: 0.85 g). Mw=$0.52 \times 10^4$.

EXAMPLE 9

In a 50-ml autoclave, 1,015.0 mg (2.5 mmol) of 4,4'-diiodobiphenyl, 620.8.6 mg (2.5 mmol) of bis(4-aminophenyl)sulfone, 51.3 mg (0.15 mmol) of dicobalt octacarbonyl, 314.7 mg (1.2 mmol) of triphenylphosphine, and 989.6 mg (6.5 mmol) of 1,8-diazabicyclo[5,4,0]-7-undecene were dissolved in dimethylacetamide (5.0 ml), and similarly to Example 1, the inside was pressurized to 20 kg/cm$^2$ with carbon monoxide, and the reaction was carried out at 150° C. for 24 hours. After the reaction, the deposited solid was washed with methanol and was dried under reduced pressure to obtain the intended polyamide compound (yield: 1.01 g). Mw=$0.86 \times 10^4$.

EXAMPLE 10

In a 50-ml autoclave, 1,015.0 mg (2.5 mmol) of 4,4'-diiodobiphenyl, 620.8.6 mg (2.5 mmol) of bis(4-aminophenyl)sulfone, 53.1 mg (0.30 mmol) of cobalt acetate anhydride, 314.7 mg (1.2 mmol) of triphenylphosphine, and 989.6 mg (6.5 mmol) of 1,8-diazabicyclo[5,4,0]-7-undecene were dissolved in dimethylacetamide (5.0 ml), and similarly to Example 1, the inside was pressurized to 20 kg/cm$^2$ with carbon monoxide, and the reaction was carried out at 150° C. for 24 hours. After the reaction, the deposited solid was washed with methanol and was dried under reduced pressure to obtain the intended polyamide compound (yield: 0.99 g). Mw=$0.65 \times 10^4$.

EXAMPLE 11

In a 50-ml autoclave, 1,015.0 mg (2.5 mmol) of 4,4'-diiodobiphenyl, 620.8.6 mg (2.5 mmol) of bis(4-aminophenyl)sulfone, 39.0 mg (0.30 mmol) of cobalt chloride anhydride, 314.7 mg (1.2 mmol) of triphenylphosphine, and 989.6 mg (6.5 mmol) of 1,4-diazabicyclo[2,2,2]octane were dissolved in dimethylacetamide (5.0 ml), and similarly to Example 1, the inside was pressurized to 20 kg/cm² with carbon monoxide, and the reaction was carried out at 150° C. for 24 hours. After the reaction, the deposited solid was washed with methanol and was dried under reduced pressure to obtain the intended polyamide compound (yield: 1.37 g). Mw=1.42×10⁴.

EXAMPLE 12

In a 50-ml autoclave, 1,015.0 mg (2.5 mmol) of 4,4'-diiodobiphenyl, 620.8.6 mg (2.5 mmol) of bis(4-aminophenyl)sulfone, 39.0 mg (0.30 mmol) of cobalt chloride anhydride, 314.7 mg (1.2 mmol) of triphenylphosphine, and 770.0 mg (6.5 mmol) of 1,5-diazabicyclo[4,3,0]none-5-ene were dissolved in dimethylacetamide (5.0 ml), and similarly to Example 1, the inside was pressurized to 20 kg/cm² with carbon monoxide, and the reaction was carried out at 150° C. for 24 hours. After the reaction, the deposited solid was washed with methanol and was dried under reduced pressure to obtain the intended polyamide compound (yield: 1.04 g). Mw=1.21×10⁴.

EXAMPLE 13

In a 50-ml autoclave, 1,015.0 mg (2.5 mmol) of 4,4'-diiodobiphenyl, 620.8.6 mg (2.5 mmol) of bis(4-aminophenyl)sulfone, 39.0 mg (0.30 mmol) of cobalt chloride anhydride, 314.7 mg (1.2 mmol) of triphenylphosphine, and 989.6 mg (6.5 mmol) of 1,8-diazabicyclo[5,4,0]-7-undecene were dissolved in 1-methyl-1-pyrrolidone (5.0 ml), and similarly to Example 1, the inside was pressurized to 5 kg/cm² with carbon monoxide, and the reaction was carried out at 150° C. for 24 hours. After the reaction the deposited solid was washed with methanol and was dried under reduced pressure to obtain the intended polyamide compound (yield: 1.31 g). Mw=2.44×10⁴.

EXAMPLE 14

In a 50-ml autoclave, 1,015.0 mg (2.5 mmol) of 4,4'-diiodobiphenyl, 620.8.6 mg (2.5 mmol) of bis(4-aminophenyl)sulfone, 39.0 mg (0.30 mmol) of cobalt chloride anhydride, 314.7 mg (1.2 mmol) of triphenylphosphine, and 989.6 mg (6.5 mmol) of 1,8-diazabicyclo[5,4,0]-7-undecene were dissolved in N,N-dimethylformamide (5.0 ml), and similarly to Example 1, the inside was pressurized to 5 kg/cm² with carbon monoxide, and the reaction was carried out at 150° C. for 24 hours. After the reaction, the deposited solid was washed with methanol and was dried under reduced pressure to obtain the intended polyamide compound (yield: 1.15 g). Mw=2.39×10⁴.

EXAMPLE 15

In a 50-ml autoclave, 1,015.0 mg (2.5 mmol) of 4,4'-diiodobiphenyl, 620.8.6 mg (2.5 mmol) of bis(4-aminophenyl)sulfone, 39.0 mg (0.30 mmol) of cobalt chloride anhydride, 314.7 mg (1.2 mmol) of triphenylphosphine, and 989.6 mg (6.5 mmol) of 1,8-diazabicyclo[5,4,0]-7-undecene were dissolved in hexamethylphosphoramide (5.0 ml), and similarly to Example 1, the inside was pressurized to 5 kg/cm² with carbon monoxide, and the reaction was carried out at 150° C. for 24 hours. After the reaction, the deposited solid was washed with methanol and was dried under reduced pressure to obtain the intended polyamide compound (yield: 1.21 g). Mw=2.35×10⁴.

Having described our invention as related to the present embodiments, it is our intention that the invention not be limited by any of the details of the description, unless otherwise specified, but rather be construed broadly within its spirit and scope as set out in the accompanying claims.

What we claim is:

1. A method for producing aromatic polyamides represented by the following formula (III), which comprises reacting an aromatic dihalogen compound represented by the following formula (I) with a diamine compound represented by the following formula (II) in the presence of cobalt/phosphine complex and a basic substance under carbon monoxide atmosphere:

$$X_1-Ar-X_2 \qquad \text{formula (I)}$$

wherein Ar represents an aromatic residue and $X_1$ and $X_2$ each represent a bromine or iodine atom, $$H_2N-R-NH_2 \qquad \text{formula (II)}$$

wherein R represents a divalent hydrocarbon group, and formula (III)

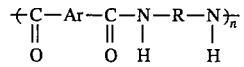

wherein Ar and R each have the same meaning as the above, and n is a positive integer.

2. The method for producing aromatic polyamides as claimed in claim 1, wherein Ar in formula (I) is selected from the group consisting of a substituted or unsubstituted benzene ring, a naphthalene ring, an anthracene ring, a phenonthrene ring, and a thiophene ring.

3. The method for producing aromatic polyamides as claimed in claim 1, wherein R in formula (II) is a divalent aromatic group or a divalent aliphatic group.

4. The method for producing aromatic polyamides as claimed in claim 1, wherein the aromatic dihalogen compound represented by formula (I) is used in 0.9 to 1.1 (molar ratio) to the diamine compound represented by formula (II).

5. The method for producing aromatic polyamides as claimed in claim 1, wherein the amount of cobalt/phosphine complex to be used is ½ to 1/1000 mol equivalent, in terms of cobalt atom, to the aromatic dihalogen compound.

6. The method for producing aromatic polyamides as claimed in claim 1, wherein the cobalt/phosphine complex is formed by loading a cobalt salt and a phosphine into a reaction vessel under reaction condition.

7. The method for producing aromatic polyamides as claimed in claim 1, wherein the basic substance is selected from the group consisting of an aliphatic amine, a cyclic amine, an aromatic amine, and an inorganic amine.

8. The method for producing aromatic polyamides as claimed in claim 1, wherein the amount of basic substance to be added is 2 to 4 mol equivalents to the aromatic dihalogen compound.

9. The method for producing aromatic polyamides as claimed in claim 1, wherein the reaction is carried out under pressure of carbon monoxide.

10. The method for producing aromatic polyamides as claimed in claim 1, wherein the reaction is carried out under a pressure of carbon monoxide at 1 to 100 kg/cm$^2$ in terms of gauge pressure.

11. The method for producing aromatic polyamides as claimed in claim 1, wherein the reaction is carried out at a temperature in the range of 100° to 200° C.

12. The method for producing aromatic polyamides as claimed in claim 1, wherein the reaction is carried out for a period of time in the range of 5 to 72 hours.

13. The method for producing aromatic polyamides as claimed in claim 1, wherein the reaction is carried out in a solvent.

14. The method for producing aromatic polyamides as claimed in claim 1, wherein the reaction is carried out in an amide solvent.

15. The method for producing aromatic polyamides as claimed in claim 1, wherein n is an integer between 5 and 1,000.

16. The method for producing aromatic polyamides as claimed in claim 1, wherein the compound represented by formula (I) is a dibromo compound or a diiodo compound.

17. The method for producing aromatic polyamides as claimed in claim 16, wherein the compound represented by formula (I) is 1,3-dibromobenzene, 1,4-dibromobenzene, dibromonaphthalene, dibromoanthracene, dibromophenanthrene, bis(3-bromophenyl)methanol, bis(4-bromophenyl)methane, bis(4-bromophenyl)ether, bis(4-bromophenyl)sulfide, bis(4-bromophenyl)sulfone, 2,5-dibromothiophene, 4,4'-dibromobiphenyl, 2,7-dibromo-9,10-dihydrophenanthrene, 1,4-diiodobenzene, diiodonaphthalene, diiodoanthracene, diiodophenanthrene, bis(3-iodophenyl)methanol, bis(4-iodophenyl)methane, bis(4-iodophenyl)ether, bis(4-iodophenyl)sulfide, bis(4-iodophenyl)sulfone, 2,5-diiodothiophene, 4,4'-diiodobiphenyl, or 2,7-diiodo-9,10-dihydrophenanthrene.

18. The method for producing aromatic polyamides as claimed in claim 1, wherein the diamine compound represented by formula (II) is an aromatic diamine or an aliphatic diamine.

19. The method for producing aromatic polyamides as claimed in claim 1, wherein the compound represented by formula (II) is 1,3-diaminobenzene, 1,4-diaminobenzene, diaminonaphthalene, diaminoanthracene, diaminophenanthrene, bis(4-aminophenyl)methane, bis(4-aminophenyl)ether, bis(4-aminophenyl)sulfide, bis(4-aminophenyl)sulfone, 2,5-diaminothiophene, 4,4'-diaminobiphenyl, 2,7-diamino-9,10-dihydrophenanthrene, 1,2-diaminoethane, 1,3-diaminopropane, 1,4-diaminobutane, 1,5-diaminopentane, 1,6-diaminohexane, 1-8-diaminooctane, or 1,10-diaminodecane.

20. The method for producing aromatic polyamides as claimed in claim 1, wherein the reaction is carried out at a temperature in the range of 150° C. to 200° C.

* * * * *